(12) United States Patent
Aigner et al.

(10) Patent No.: US 6,561,028 B1
(45) Date of Patent: May 13, 2003

(54) MECHANICAL RESONATOR FOR A ROTATION SENSOR

(75) Inventors: Robert Aigner, München (DE); Reinhold Noe, Paderborn (DE); Philipp Sasse, Paderborn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/636,533

(22) Filed: Aug. 10, 2000

(30) Foreign Application Priority Data

Aug. 10, 1999 (DE) .......................... 199 37 747

(51) Int. Cl.$^7$ ............................................. G01C 19/00
(52) U.S. Cl. ................. 73/504.11; 73/504.15; 73/504.18
(58) Field of Search .................. 73/503.3, 504.02, 73/504.04, 504.08, 504.09, 504.11, 504.12, 504.14, 504.15, 504.18, 514.15, 514.16, 514.21, 514.32, 514.23, 514.36, 651; 310/365–371

(56) References Cited

U.S. PATENT DOCUMENTS

| | | | | |
|---|---|---|---|---|
| 5,511,419 A | | 4/1996 | Dunn ....................... | 73/504.08 |
| 5,650,568 A | * | 7/1997 | Greiff et al. .............. | 73/504.09 |
| 5,992,233 A | * | 11/1999 | Clark ........................ | 361/280 |
| 6,067,858 A | * | 5/2000 | Clark et al. ............... | 73/504.16 |
| 6,250,156 B1 | * | 6/2001 | Seshia et al. ............. | 73/504.12 |
| 6,257,059 B1 | * | 7/2001 | Weinberg et al. ......... | 73/504.16 |

FOREIGN PATENT DOCUMENTS

DE 195 23 895 A1 1/1997
DE 196 48 425 C1 1/1998

OTHER PUBLICATIONS

Thor Juneau et al.: "Dual Axis Operation of a Micromachined Rate Gyroscope", *Proceedings IEEE Transducers'97*, 1997.

T. Fujita et al.: "Two–Dimensional Micromachined Gyroscope", *Proceedings IEEE Transducers'97*, 1997.

W. Geiger et al.: "New Designs of Micromachined Vibrating Rate Gyroscopes with Decoupled Oscillation Modes", *Proceedings IEEE Transducers'97*, 1997.

Ralf Voss et al.: "Silicon Angular Rate Sensor for Automotive Applications with Piezoelectric Drive and Piezoresistive Read–out", *Proceedings IEEE Transducers'97*, 1997.

Kyu–Yeon Park et al.: "Laterally oscillated and force–balanced micro vibratory rate gyroscope supported by fish–hook–shaped springs", *Sensors and Actuators, vol. A 64, 1999, pp. 69–76*.

\* cited by examiner

Primary Examiner—Daniel S. Larkin
Assistant Examiner—Rose M. Miller
(74) Attorney, Agent, or Firm—Laurence A. Greenberg; Werner H. Stemer; Ralph E. Locher

(57) ABSTRACT

Resonator which can be produced by micromachining and has a mass part (DF1, DF2, V1, V2) which is fixed by means of a resilient suspension (FA) to an anchoring point (AN) in such a way that it can perform rotary oscillations in its plane, in which, in the rest position of the mass part, the resilient suspension is aligned only along an axis (SAX) of symmetry with regard to which the mass part is of mirror-symmetrical design.

13 Claims, 4 Drawing Sheets

MECHANICAL RESONATOR FOR A ROTATION SENSOR

BACKGROUND OF THE INVENTION

1. Field of the Invention

Rate-of-rotation sensors (gyroscopes) measure angular velocities or, generally, rotary movements. For measurement purposes, mechanical gyroscopes generally utilize the Coriolis force, in that a rotating mass body is deflected perpendicularly to the axis of rotation after the manner of a gyrocompass. In the process, an additional torque occurs about an axis perpendicular to these two axes of rotation, which leads to the precession movement known from gryroscopes. The strength of this additional torque is a measure of the rotational movement of the entire system.

In modern technology there is a growing need to detect movements in a detailed fashion, which also includes the measurement of the angular velocity. In the course of advancing miniaturization, in particular also in connection with the increasing use of electronic circuits, rate-of-rotation sensors are demanded which can be produced such that they are very small and in particular can be integrated with electronic components. Rate-of-rotation sensors produced using surface micromachining in semiconductor technology are therefore particularly suitable for a multiplicity of applications. One difficulty in the case of such micromechanical rate-of-rotation sensors resides in the fact that a complete rotational movement of a sensor element is not desirable or not possible, in a manner governed by the construction. Micromechanical rate-of-rotation sensors therefore usually contain mass parts which can be made to perform an oscillating rotary movement (rotary oscillation).

The publication by W. Geiger et al.: "New Designs of Micromachined Vibrating Rate Gyroscopes with Decoupled Oscillation Modes", in Proceedings IEEE Transducers 97, Chicago, June 1997, describes a rate-of-rotation sensor in which resilient torsional articulated joints are present between an inner part and an outer part of the movable mass. The intention is thus to compensate for or damp torques which act vertically with respect to the mass part and arise during the movement of the mass part because the resilient suspensions do not have a vertical axis of symmetry in their cross section, that is to say are parallelogram shaped, for example. This coupling between horizontal drive oscillation and vertical movement results, assuming isotropic elasticity properties, from a mixed planar moment of inertia of the suspension of the mass part with regard to the axes of movement of horizontal drive oscillation and vertical Coriolis movement. Therefore, it is necessary for the areas for detecting the Coriolis movement to be arranged and designed in such a way that vertical deflection of the suspension does not lead to a change in the detection signal. Moreover, as disclosed e.g. in the publication by R. Voss et al.: "Silicon Angular Rate Sensor for Automotive Applications with Piezoelectric Drive and Piezoresistive Read-out" in Proceedings IEEE Transducers 97, Chicago, June 1997, approximate correspondence between the resonant frequencies of the horizontal rotary oscillation and the vertical Coriolis oscillation to be detected is intended to be obtained.

DE 195 23895 A1 discloses a rate-of-rotation sensor having an oscillatory structure comprising two oscillating masses coupled rigidly to one another. The oscillatory structure is mounted on a substrate at a bearing point which coincides with the center of mass of the oscillatory structure. Situated below the oscillatory structure in the substrate are electrodes which capacitively detect the distance between the oscillatory structure and the substrate. Furthermore, a circuit arrangement is provided which, from the signal of the electrodes, determines a measure of the Coriolis acceleration acting on the rate-of-rotation sensor. This sensor has the disadvantage that if the oscillatory structure approaches the substrate to an excessive extent, the signal generated by the electrodes can lead to the circuit arrangement being overdriven.

SUMMARY OF THE INVENTION

The object of the present invention is to specify a mechanical resonator for rotation sensors which can be produced by micromachining and in which, even in the case of relatively large production tolerances, the measurement is not falsified by torques that additionally occur.

This object is achieved by means of the mechanical resonator having the features of claim 1. Refinements emerge from the dependent claims.

The resonator according to the invention comprises a mass part which functions as a centrifugal mass and is fixed by means of resilient suspension on a support. In the rest position of the mass part there exists an axis of symmetry with regard to which the mass part and the resilient suspension are mirror-symmetrical. The resilient suspension by which the mass part is fixed on a support is in the form of a strip and is aligned along said axis of symmetry. There are no suspensions which do not coincide with said axis of symmetry in the rest position of the mass part. The resonator is provided for detecting a rotary movement about an axis running perpendicularly to said axis of symmetry. The additional rotary oscillation which is excited on account of the Coriolis force is then effected about the axis of symmetry. Therefore, outside this axis of symmetry, the mass part is provided with electrically conductive areas as electrodes for detecting deflection of the mass part out of the plane of the rest position, which are assigned corresponding counterelectrodes lying opposite on the support. The electrode areas are preferably designed in such a way that during a rotary oscillation of the activated resonator, the form of the areas in which the electrodes overlap one another always remains the same. In the rest position, these overlap areas are preferably mirror-symmetrical with regard to the axis about which a rotary movement to be detected is effected. Negative feedback electrodes on the support are furthermore arranged opposite the electrode areas in the perpendicular direction. The negative feedback electrodes are arranged and dimensioned in such a way that by applying electrical potentials to the negative feedback electrodes, it is possible to compensate for a torque acting on the mass part about the straight line along which the resilient suspension is aligned.

DESCRIPTION OF THE PREFERRED EMBODIMENTS

Figure 1:
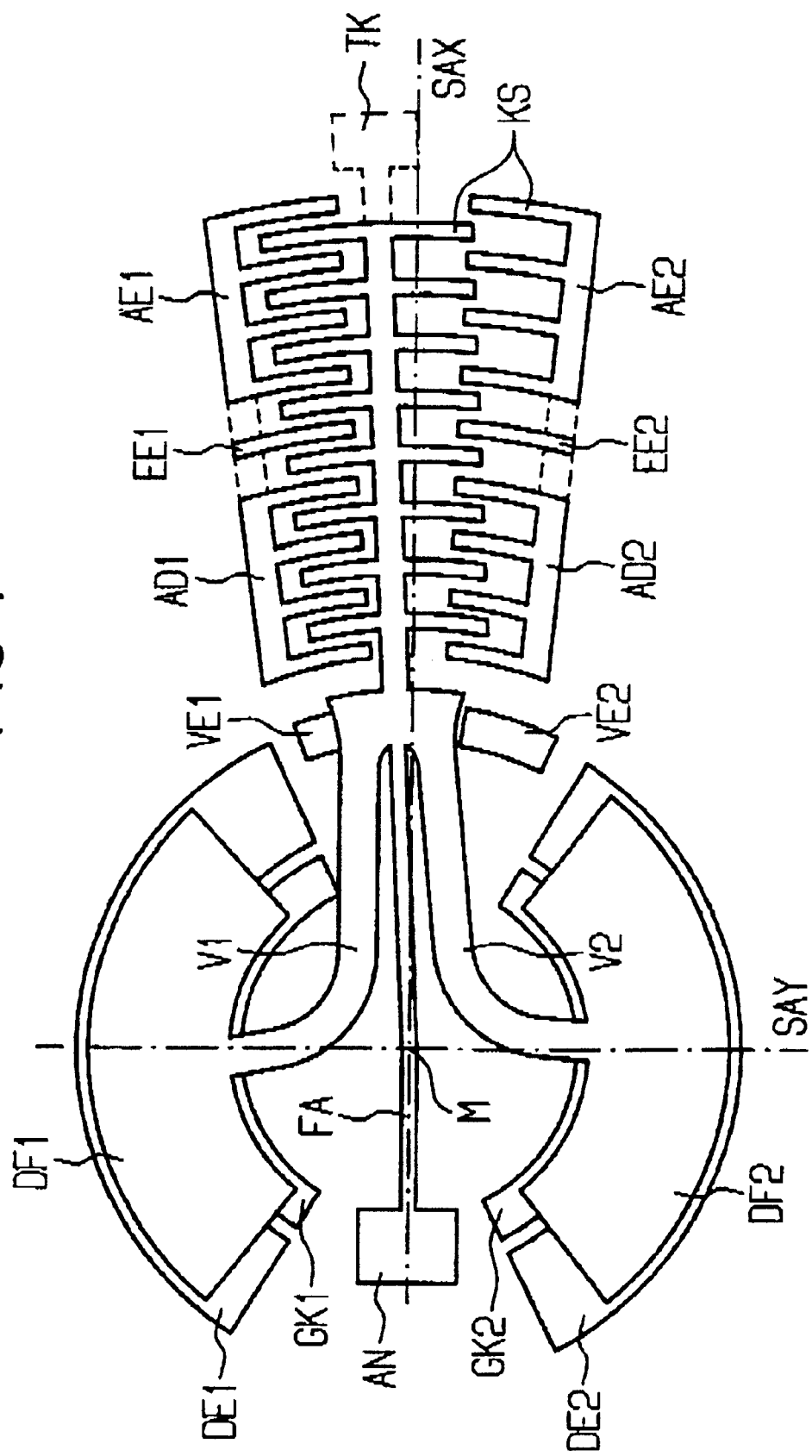
FIG. 1 is a diagrammatic cross-sectional view of a resonator according to the invention in a deflected position.

Referring now to the figures of the drawing in detail and first, particularly, to the FIG. 1 thereof, there is shown a mechanical resonator which can be produced by micromachining according to the invention in plan view. This resonator has a mass part (seismic mass) DF1, DF2, V1, V2 which is designed in a layer-like manner essentially in one plane and may preferably be produced from polysilicon or monocrystalline silicon. This mass part is fixed by means of a resilient suspension FA with an anchoring point AN on a support. The support may be e.g. a substrate made of semiconducting material, preferably made of silicon. Electronic components serving to drive the resonator and to detect and evaluate measurement signals can then be integrated in the semiconductor body. In FIG. 1, a straight line SAX which is stationary with regard to the support is depicted as the axis of symmetry of the resonator in the rest position. For illustration purposes, the drawing shows the resonator in a position deflected out of the rest position. The resilient suspension FA, which-runs along the straight line SAX in the rest position, is therefore curved out from the direction of the straight line SAX in the illustration of the drawing. However, the fixing point of the resilient suspension FA on the anchoring point AN remains on the straight line SAX during every movement.

The mass part has detection areas DF1, DF2, which are rigidly connected to one another by connections V1, V2 in this exemplary embodiment. The detection areas are electrically conductively designed as electrodes and are electrically conductively connected to an electrical connection on the support. In this exemplary embodiment, the electrical connection is effected through the anchoring point AN via the connections V1, V2 and the resilient suspension FA. Preferably, the entire mass part is of electrically conductive design, e.g. by introducing dopant into the silicon. In order to excite the rotary oscillation, in this exemplary embodiment there is a comb structure KS formed by a multiplicity of electrode fingers which are intermeshed with one another, of which some are fitted to a beam fitted to the mass part and some are fitted to electrodes fixed on the support. In order to control the rotary oscillation that is produced, there may be, in addition to the actual drive electrodes AE1, AE2, also drive detection electrodes AD1, AD2, which are likewise intermeshed in a comb-like manner with the electrodes on the mass part. The drive detection electrodes AD1, AD2 can be shielded from the drive electrodes AE1, AE2 by shielding electrodes EE1, EE2. If there are no drive detection electrodes present, the drive electrodes may encompass the entire region of the comb structure, which is indicated by the broken lines between the shielding electrodes EE1, EE2 and the respectively adjacent electrodes in FIG. 1.

This drive apparatus excites the mass part to perform rotary oscillations about an axis running perpendicularly to the plane of the drawing. If the entire system is subjected to a rotary movement, by the support being rotated about the straight line SAY (FIG. 1), said straight line being stationary with regard to the support, as a result of the rotary oscillation which the mass part performs in the plane of the drawing, the torque resulting from the Coriolis force occurs about the straight line SAX. This leads to the mass part being rotated out of the plane of its rest position, which, owing to the elasticity of the resilient suspension FA, leads to a further rotary oscillation, the latter being effected about the straight line SAX, however. One of the detection areas of the mass part therefore approaches the surface of the support whilst the other detection area moves away from this surface.

As an example, FIG. 1 depicts detection electrodes DE1, DE2 arranged on said surface of the support. Instead of being present on the top side of the support between the mass part and the support, such detection electrodes can be present on that side of the mass part which is remote from the support. Likewise, detection electrodes can be arranged on both sides of the mass part in the direction perpendicular to the plane of the mass part. An approach between a detection area and a detection electrode is preferably measured capacitively. The situation where a detection area approaches a detection electrode to an excessive extent, which would possibly overdrive a connected evaluation circuit, can be precluded because the torque which leads to the rotation of the mass part out of the plane of its rest position is compensated for electrostatically using additional negative feedback electrodes GK1, GK2. Suitable electrical potentials by means of which the torques acting on the mass part about the straight line SAX are compensated for electrostatically are applied to the negative feedback electrodes. From the level of the potentials which are necessary for this purpose, it is possible to infer the strength of the torques. The measurement can therefore be effected according to the force compensation principle (force balance) in such a way that the mass part always remains in the plane of its rest position. This makes it possible, in particular, for the distance between the detection areas DF1, DF2 and the detection electrodes DE1, DE2 to be chosen to be particularly small, which increases the sensitivity of a sensor realized using the resonator according to the invention.

If no negative feedback electrodes are provided, the detection electrodes preferably occupy the entire region occupied by the detection electrodes and the negative feedback electrodes in FIG. 1. What this achieves, in particular, is that each time the mass part is deflected in the drive rotary oscillation, the geometrical form of the area in which the detection electrodes and the detection areas overlap perpendicularly to the plane of the mass part remains the same. If detection electrodes are present both below (on the surface of the support) and above (on the side remote from the support) of the mass part, they are preferably electrically conductively cross-connected to one another in pairs, so that optimum detection sensitivity is achieved. The components of the mass part and the detection electrodes and, if appropriate, the negative feedback electrodes are preferably formed in such a way that the area of overlap, that is to say the perpendicular projection—with regard to the plane of the mass part—of the mass part onto the detection and negative feedback electrodes, is mirror-symmetrical with regard to the straight line SAX and the straight line SAY in the rest position of the mass part.

Moreover, compensation electrodes VE1, VE2 may additionally be fitted such that they are immobile relative to the support, which electrodes likewise overlap an electrically conductive portion of the mass part. By applying a suitably chosen static voltage difference between each of these compensation electrodes VE1, VE2 and the mass part, it is possible to compensate for a deflection-proportional vertical force which is produced in the case of a parallelogram shaped cross section of the resilient suspension FA. The compensation electrodes or at least the areas of said electrodes which overlap the mass part during the rotary movement of the mass part are preferably designed for this purpose in such a way that a deflection-proportional restoring torque is produced. That is achieved by choosing the areas of the compensation electrodes in such a way that, during a deflection of the mass part, the areas of overlap between the mass part and the compensation electrodes change more than proportionally with the angle of rotation of the mass part. The areas of the compensation electrodes may be of wedge-shaped design, for example, as illustrated in FIG. 1.

In order that, in the embodiment illustrated in FIG. 1, with only one strip-type resilient suspension FA, a rotary oscillation can be excited about the center of gravity of the mass part with the least possible unbalance, the geometry of the arrangement is chosen, if possible, in such a way that the center of gravity of the mass part, which, in the embodiment of FIG. 1, coincides approximately with the midpoint M of the main part—formed from the detection areas DF1, DF2—of the mass part, is located in the second quarter of the resilient suspension.FA, measured from the anchoring point AN. It is particularly favorable if the midpoint M of the mass part is located in the region of ⅓ to ⅔ of the length of the resilient suspension FA away from the anchoring point AN. As is also described in the publication by R. Voss et al. cited in the introduction, rotation sensors which detect oscillatory Coriolisforces, it is best to ensure approximate identity of the mechanical resonant frequencies of the drive movement and of the Coriolis oscillation. For this purpose, the height of the resilient suspension FA (perpendicular to the plane of the drawing in FIG. 1) is preferably chosen to be larger than its width (in the plane of the drawing in FIG. 1), for example from two to four times as high. If the resonant frequency of the drive is nevertheless higher than the resonant frequency of the Coriolis oscillation, the resonant frequency of the drive can be reduced by fitting additional comb structures KS, extending radially further outward, or inertia bodies TK depicted by broken lines in FIG. 1. The resonant frequencies can also be balanced by balancing the potential differences applied between the detection electrodes DE1, DE2 and the detection areas DF1, DF2.

Figure 2:
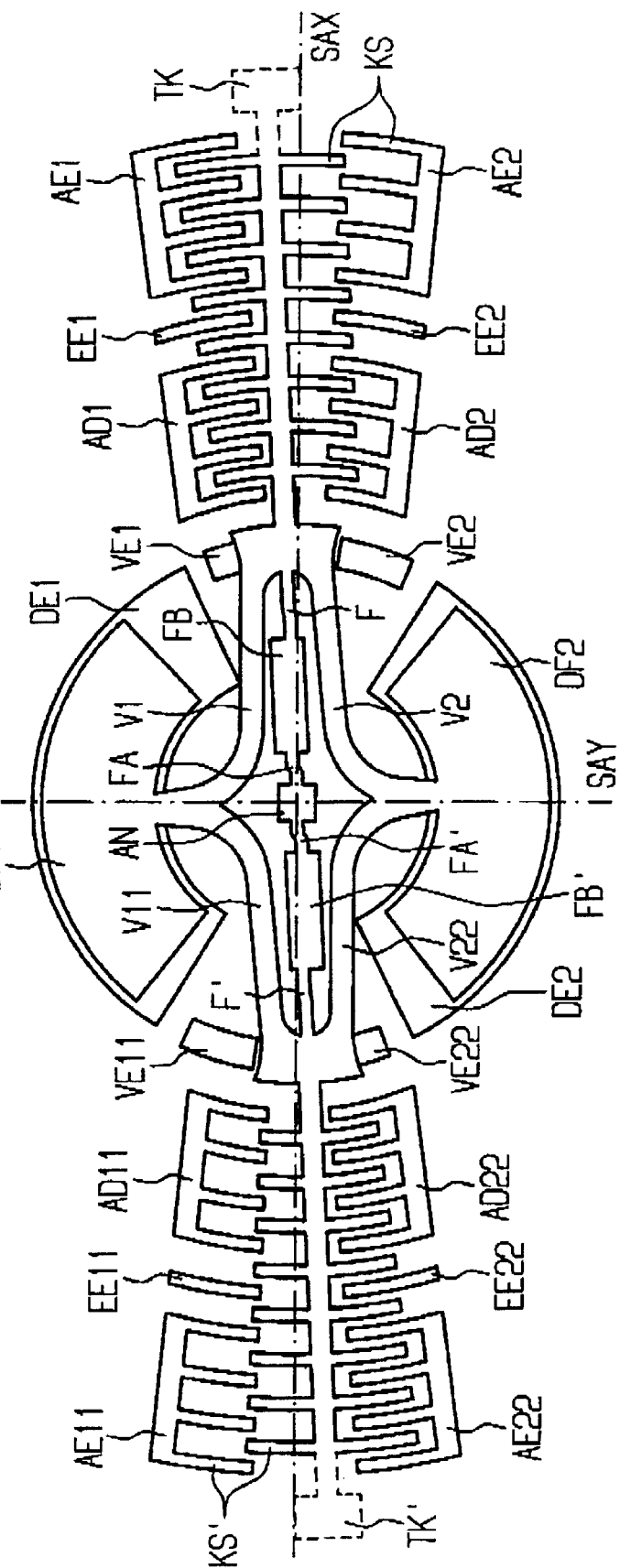
FIG. 2 is a diagrammatic cross-sectional view of an alternative embodiment of FIG. 1 in a deflected position.

FIG. 2 illustrates an exemplary embodiment in which the resonator is also mirror-symmetrical with regard to the straight line SAY in the rest position. This ensures reliable functioning of the drive through the comb structures KS, KS', in particular if the-resonator is produced from silicon. A further important advantage is that, in the case of the resilient suspensions FA, FA' having cross sections formed trapezoidally on account of the production process, the restoring torques caused thereby about the straight line SAX mutually compensate for one another on both sides. The anchoring point AN is now situated in the center of the resonator. The resilient suspensions are stretched during the rotary oscillation of the resonator and bend in an S-shaped manner. It is advantageous, therefore, if, as illustrated as an example in FIG. 2, the resilient suspensions FA, FA', which are fixed to the anchoring point AN, merge with somewhat stiffer beams FB, FB', which, for their part, are fixed to the mass part by more elastic spring elements F, F'. The higher bending stiffness of the beams has only little adverse effect on S-shaped bending of the suspension, while the torsional stiffness significantly increases. As a result, it is possible to achieve a more favorable ratio of the two resonant frequencies (drive and Coriolis oscillations).

The exemplary embodiment of FIG. 2, like the exemplary embodiment of FIG. 1, is provided not only with drive electrodes AE1, AE2, AE11, AE22 but also with drive detection electrodes AD1, AD2, AD1, AD22 and shielding electrodes EE1, EE2, EE11, EE22. Optionally expedient inertia bodies TK, TK' are depicted by broken lines. The negative feedback electrodes are omitted in this example; instead, a pair of compensation electrodes VE11, VE22 arranged symmetrically with respect to the first pair is additionally present. In this case, the resonator is again illustrated in a position rotated out of the rest position.

Figure 3:
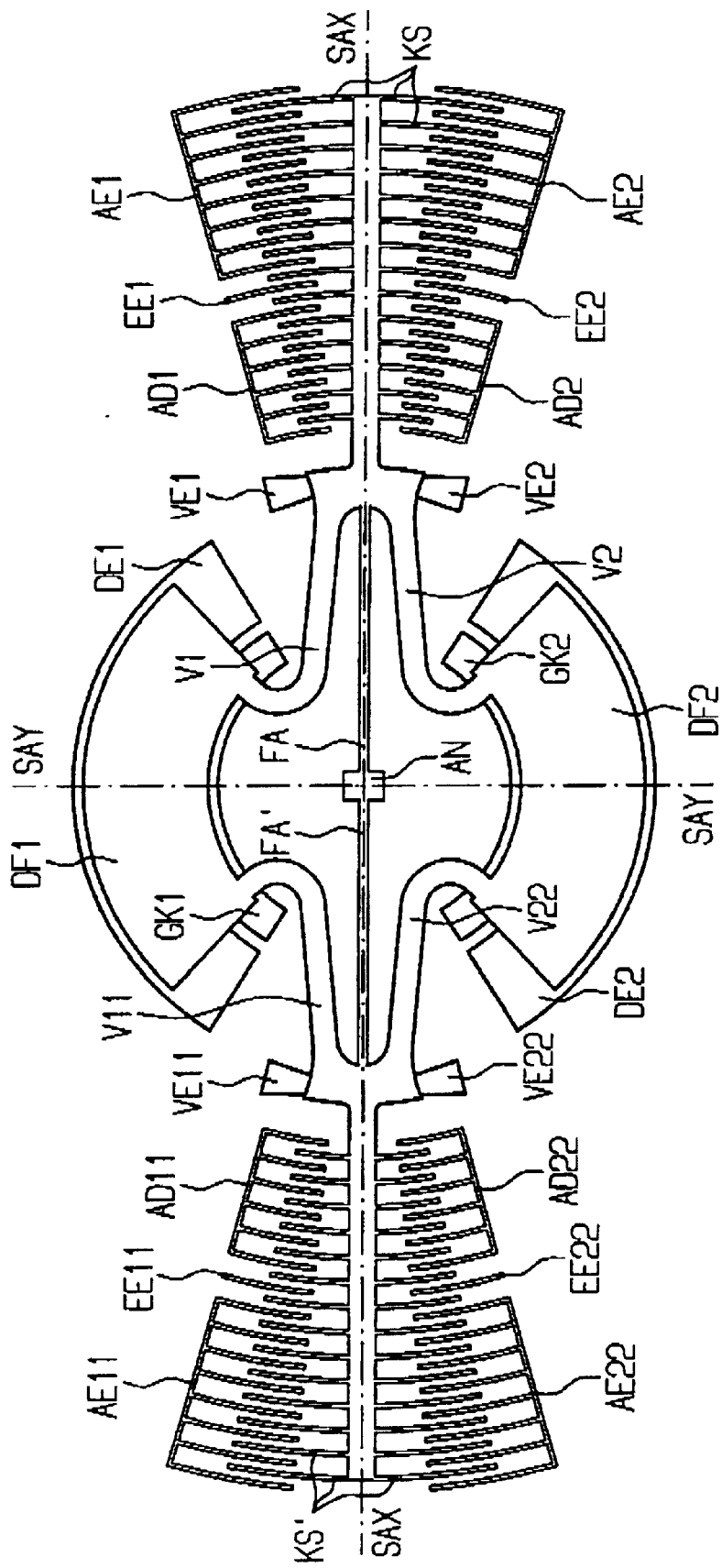
FIG. 3 is a diagrammatic cross-sectional view of an alternative embodiment of FIG. 1 in a rest position.

FIG. 3 shows a corresponding exemplary embodiment with negative feedback electrodes GK1, GK2 present, the function of which has already been explained in connection with the description of the exemplary embodiment as shown in FIG. 1.

In FIG. 3, the resonator is drawn in the rest position, so that the symmetry with regard to the straight lines SAX and SAY is clearly discernible. The stiffening beams of the suspension are omitted in this exemplary embodiment, with the result that the resilient suspensions FA, FA' are led from the anchoring point AN directly to the mass part. In this case, the struts V1, V2, V11, V22 led to the detection areas DF1, DF2 are made somewhat thinner than in the example of FIG. 2. The inclined orientation of these struts nevertheless results in sufficient stability for the mass part.

Figure 4:
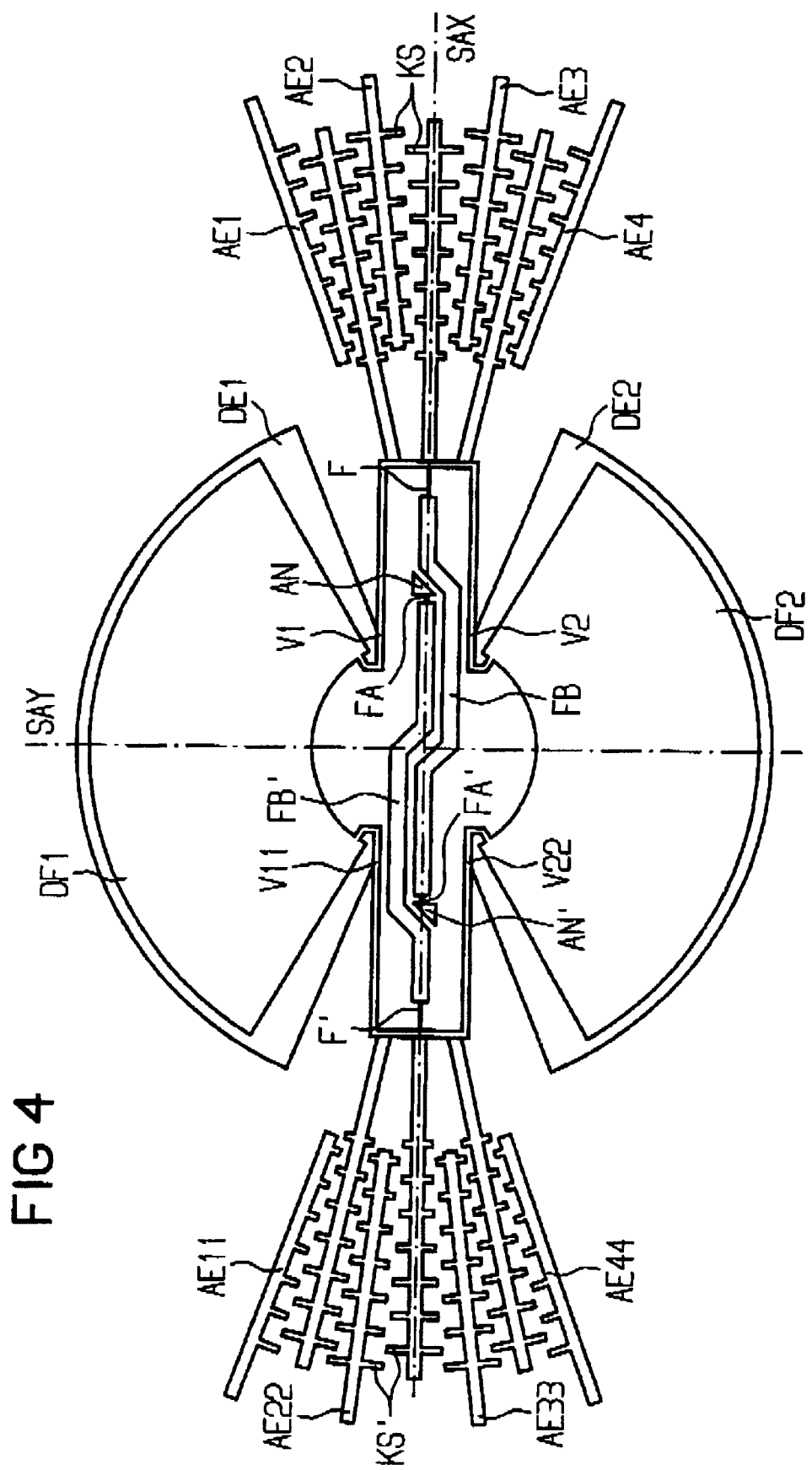
FIG. 4 is a diagrammatic cross-sectional view of an alternative embodiment of FIG. 1 in a rest position.

FIG. 4 shows an exemplary embodiment in which the mass part is suspended from two anchoring points AN, AN'. In addition to the resilient suspensions FA, FA', beams FB, FB' and further spring elements F, F' are present in this case, too. The orientations of the suspensions are in opposite senses to one another, the beams FB, FB', whose ends each lie on the straight line SAX, being led parallel to one another along a section. The portions of the beams FB, FB' which do not run on the straight line SAX are made so wide and/or high that they can be regarded practically as rigid in comparison with the resilient suspensions FA, FA' and spring elements F, F'. This exemplary embodiment has the advantage that the ratio of the resonant frequencies of the Coriolis oscillation about the straight line SAY and of the drive rotary oscillation is larger. That permits the use of higher voltages between the detection electrodes DE1, DE2 and the detection areas DF1, DF2 of the mass part, which results in an increase in the sensitivity.

Instead of projecting only on one side of the straight line SAX as shown in FIG. 4, the beams FB, FB' can also project on both sides beyond the straight line SAX, that is to say be curved in an S-shaped manner. Once again negative feedback electrodes and compensation electrodes may be present in each case. The comb structures KS, KS' are present along a plurality of beams in this example. Some of the drive electrodes AE1, AE2, AE3, AE4, AE11, AE22, AE33, AE44 can be used as drive detection electrodes. Those components of the different exemplary embodiments which serve for drive and detection can be combined variously with one another.

What is claimed is:
1. A mechanical resonator, comprising:
at least one resilient suspension;
at least one anchor;
a mass part layered predominantly in one plane and fixed by said resilient suspension to said at least one anchor for allowing rotary oscillations of said mass part about a rest position in said plane, said mass part having electrically conductive detection areas, said mass part to be rotated out of said plane about an axis running in said plane in said rest position, said axis being stationary relative to said at least one anchor, said mass part mirror image symmetrical in said plane about said axis when said mass part is in said rest position;
said at least one resilient suspension aligned along said axis in said rest position;
electrically conductive detection electrodes disposed opposite said detection areas in a direction perpendicular to said plane and immobile relative to said at least one anchor; and
electrically conductive negative feedback electrodes disposed opposite said detection areas in said perpendicular direction, immobile relative to said at least one anchor, and disposed and dimensioned to compensate for a torque that acts on said mass part about said axis when electrical potentials are applied to said feedback electrodes.

2. The resonator according to claim 1, wherein said at least one resilient suspension has a length and ends, and is a strip of resilient material fixed to said at least one anchor at one of said ends and to said mass part at another of said ends, and said mass part has, during a rotary oscillation, a center of gravity located at a distance from said at least one anchor equal to between at least a quarter and at most a half of said length of said resilient suspension.

3. The resonator according to claim 1, wherein, in said rest position, said mass part and said resilient suspension are mirror image symmetrical on another axis, and said another axis is disposed in said plane perpendicular to said axis.

4. The resonator according to claim 1, including a beam and a spring element connecting said at least one resilient suspension to said mass part.

5. The resonator according to claim 1, wherein:

said at least one anchor is two anchors;

said two anchors are disposed on said axis; and said at least one resilient suspension is two suspensions each aligned along said axis and each fixed to a respective one of said two anchors; and including:
beams fixed to each of said two suspensions; and
spring elements fixed to each of said beams and aligned along said axis, each of said spring elements being fixed to said mass part, each of said beams having a section and ends, said ends lying on said axis, said section of one of said beams running parallel to said section of another of said beams.

6. The resonator according to claim 4, wherein:

said at least one anchor is two anchors;

said two anchors are disposed on said axis; and said at least one resilient suspension is two suspensions each aligned along said axis and each fixed to a respective one of said two anchors; and including:
beams fixed to each of said two suspensions; and
spring elements fixed to each of said beams and aligned along said axis, each of said spring elements being fixed to said mass part, each of said beams having a section and ends, said ends lying on said axis, said section of one of said beams running parallel to said section of another of said beams.

7. The resonator according to claim 1, including electrodes for exciting a rotary oscillation, some of said electrodes being rigidly connected to said mass part, and some of said electrodes being fixed on said anchor, said electrodes forming a comb for electrostatically driving the resonator.

8. The resonator according to claim 1, wherein:

said detection areas are symmetrical with respect to said axis in said rest position;

said detection areas are electrically conductively connected through said at least one resilient suspension and said anchor; and said detection electrodes and said mass part have a constant perpendicular projection configuration during rotary oscillation of the resonator; and including another axis perpendicular to said axis, said perpendicular projection configuration is mirror image symmetrical in said rest position both with respect to said axis and with respect to said another axis.

9. The resonator according to claim 1, wherein said mass part has an electrically conductively configured portion, and including compensation electrodes immobile relative to said at least one anchor and disposed opposite said configured portion of said mass part in a direction perpendicular to said plane, an area of a perpendicular projection of said mass part onto a respective compensation electrode increasing or decreasing more than proportionally with an angle of rotation during a rotary oscillation with the angle of rotation in said plane.

10. The resonator according to claim 1, including at least one inertia body connected to said mass part and disposed, in said rest position, on said axis.

11. The resonator according to claim 1, wherein said electrically conductive negative feedback electrodes are disposed and dimensioned to compensate for a torque that acts on said mass part about said axis when electrical potentials are applied to said feedback electrodes.

12. A mechanical resonator, comprising:

at least one resilient suspension;

at least one anchor;

a mass part layered predominantly in one plane and fixed by said resilient suspension to said at least one anchor for allowing rotary oscillations of said mass part about a rest position in said plane, said mass part having electrically conductive detection areas, said mass part to be rotated out of said plane about an axis running in said plane in said rest position, said axis stationary relative to said at least one anchor, said mass part mirror image symmetrical in said plane about said axis when said mass part is in said rest position;

said at least one resilient suspension aligned along said axis in said rest position;

electrically conductive detection electrodes disposed opposite said detection areas in a direction along said axis and immobile relative to said at least one anchor; and electrically conductive negative feedback electrodes disposed opposite said detection areas in a direction along said axis, immobile relative to said at least one anchor, and disposed and dimensioned to compensate for a torque that acts on said mass part about said axis when electrical potentials are applied to said feedback electrodes.

13. The resonator according to claim 12, wherein said electrically conductive negative feedback electrodes are disposed and dimensioned to compensate for a torque that acts on said mass part about said axis when electrical potentials are applied to said feedback electrodes.

* * * * *